United States Patent
Stowe et al.

[11] Patent Number: 5,845,950
[45] Date of Patent: Dec. 8, 1998

[54] PNEUMATICALLY ACTUATED MAGNETIC ARTICLE HOLDER

[75] Inventors: Michael W. Stowe, Boyne City; Gerald Thick, Clarkston; Gary R. Blaske, Oxford, all of Mich.

[73] Assignee: Industrial Magnetics, Inc., Boyne City, Mich.

[21] Appl. No.: 912,759

[22] Filed: Aug. 19, 1997

Related U.S. Application Data

[60] Provisional application No. 60/023,354, Aug. 20, 1996.
[51] Int. Cl.⁶ ...................................................... B66C 1/04
[52] U.S. Cl. .......................................... 294/65.5; 335/287
[58] Field of Search ........... 294/65.5, 88; 335/285–287, 335/295, 296; 901/40

[56] References Cited

U.S. PATENT DOCUMENTS

| | | | |
|---|---|---|---|
| 1,181,112 | 5/1916 | Charlebois . | |
| 2,417,762 | 3/1947 | Koller . | |
| 3,009,727 | 11/1961 | Jones et al. | 294/65.5 |
| 3,079,191 | 2/1963 | Engelsted et al. | 294/65.5 |
| 3,080,967 | 3/1963 | Bendix et al. . | |
| 3,250,962 | 5/1966 | Palme | 294/65.5 |
| 3,789,336 | 1/1974 | Gordin | 294/65.5 |
| 4,121,865 | 10/1978 | Littwin, Sr. . | |
| 4,813,729 | 3/1989 | Speckhart | 294/65.5 |
| 5,074,742 | 12/1991 | Anyama . | |
| 5,556,505 | 9/1996 | Hill | 901/40 |

*Primary Examiner*—Dean Kramer
*Attorney, Agent, or Firm*—Young & Basile, P.C.

[57] ABSTRACT

A pneumatically actuated magnetic workpiece/article holder is for use with a lifting assembly. The article holder comprises a housing having a magnetic assembly translationally mounted within the housing. The magnetic assembly comprises two opposed pole pieces and a permanent magnet centered and mounted between the pole pieces. A pneumatic actuator is mounted on the housing and is operatively connected to the magnetic assembly. The article holder may further comprise brackets for operatively mounting the article holder on the lifting assembly. The magnet may be formed from a rare earth metal having very strong magnetic properties, such as neodymium.

14 Claims, 4 Drawing Sheets

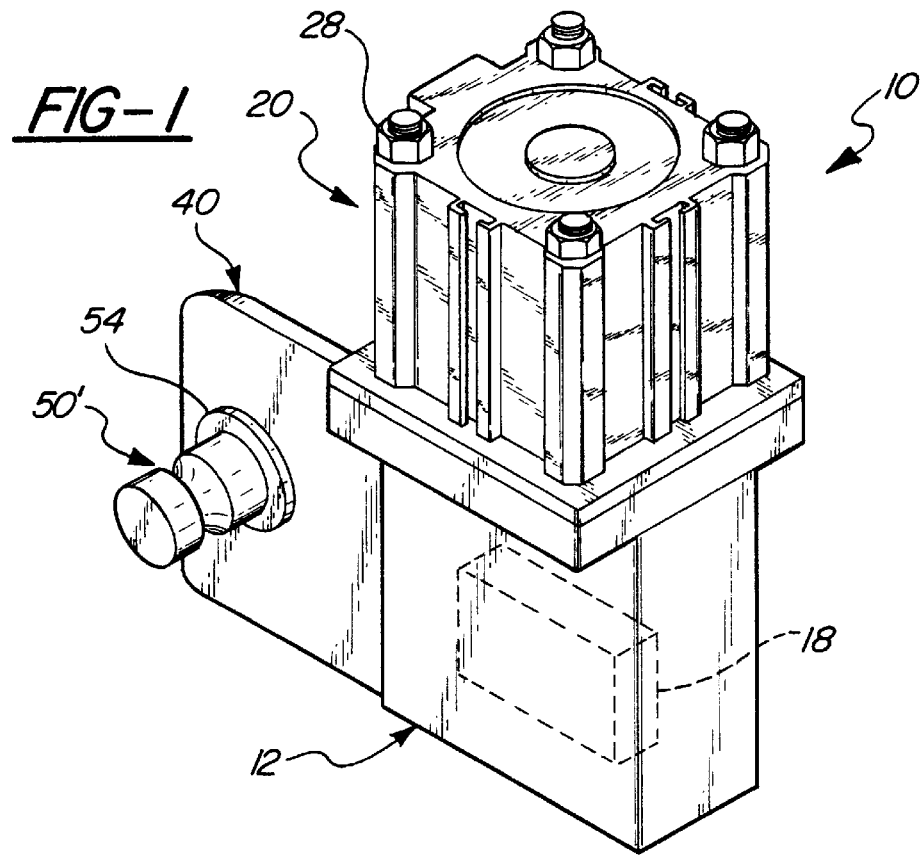
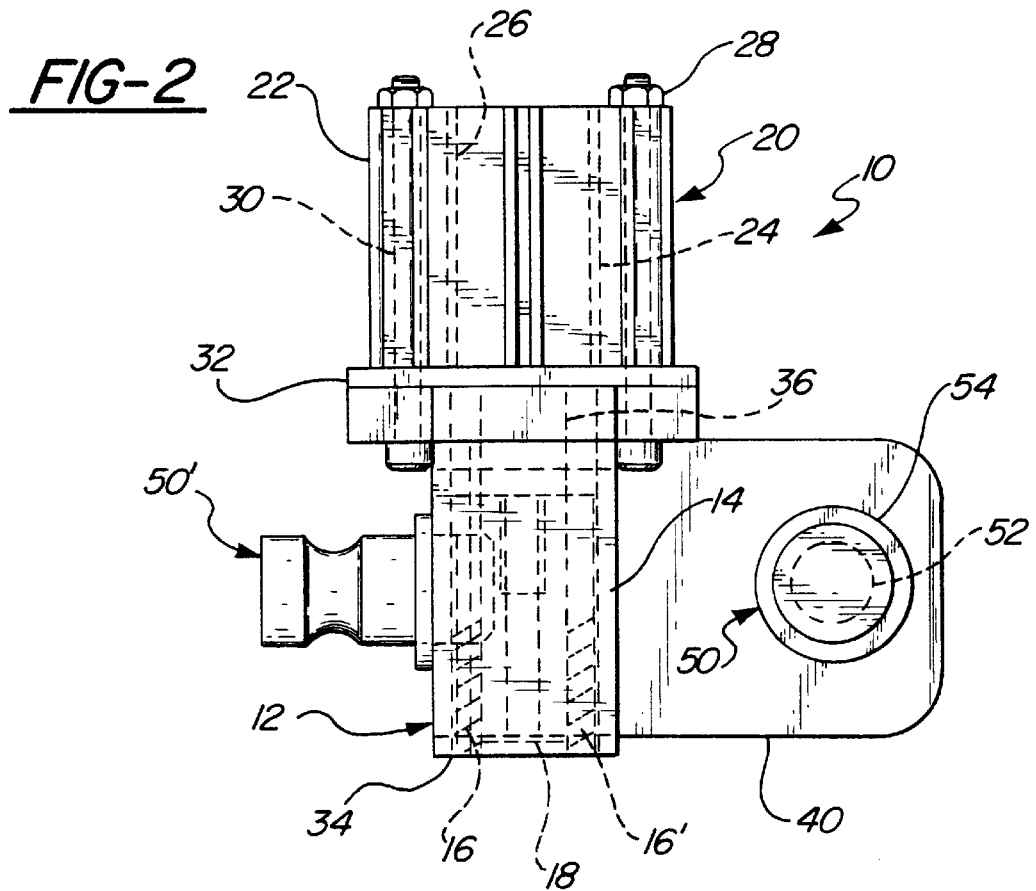

PNEUMATICALLY ACTUATED MAGNETIC ARTICLE HOLDER

CROSS-REFERENCE TO RELATED APPLICATION

This application claims the benefit of U.S. Provisional Application Ser. No. 60/023,354, filed Aug. 20, 1996.

BACKGROUND OF THE INVENTION

The present invention relates generally to magnetic article holders, and more specifically to pneumatically actuated magnetic article holders.

Many manufacturers, including automobile manufacturers, usually incorporate lifting assemblies which are manually, mechanically or robotically operated into their factories. These lifting assemblies may be utilized to move very heavy workpieces, often made from sheet metal or the like, from one operation to another, or from one area of an assembly line to another area where it may be installed onto a later stage of the product, or onto a final product. Manufacturers are continually attempting to make these lifting assemblies as safe, powerful, efficient and inexpensive to operate as possible.

Lifting assemblies have incorporated thereon some type of device for holding the article or workpiece. Some holding devices include "hand"-like gripping devices. These generally work in a satisfactory manner, however, these gripping devices are often cost prohibitive in that the gripping device is usually dedicated to one or two particularly shaped pieces. Thus, it cannot be used to lift a wide variety of differently shaped and sized workpieces, even when incorporated onto robotic arms, automation, and the like.

Electromagnetic holding devices are able to hold a wide variety of workpieces, and can be quite capable of lifting heavy loads. However, they are often larger and heavier than desired in a particular application. They also consume, in comparison to permanent magnets, a larger amount of energy in order to continually magnetize the electromagnet which may become quite expensive.

Somewhat less expensive and safer to use are vacuum suction cup holding devices, which are generally used today. These devices are able to hold a wide variety of workpieces, they can be used without increased risk of electrocution or explosion, and they are generally powerful enough to lift whatever workpiece the manufacturer desires. However, these too are not without drawbacks. The vacuum suction cups have to be relatively large in order to adequately hold and lift an article or workpiece. Further, they (and consequently the work area in which they are used) must be kept virtually free from dust, dirt, debris, etc. or they will not seal properly, thus preventing creation and/or maintenance of suction. Such inadequate suction could have annoying results at best, and disastrous results at worst. As can be appreciated, keeping vacuum suction cups clean in an automobile factory or the like takes considerable effort, which in turn expends considerable man-hours, thereby losing efficiency and costing money.

Further cost may be found in that the vacuum suction cups require a constant vacuum source which is associated with a substantial monetary cost. Vacuum suction cup holding devices are also somewhat limited in what they can hold and lift. For example, the suction cups would not be able to efficiently lift workpieces with curved surfaces since the suction cup holders require a substantially flat surface in order to function properly. It would take an inordinate amount of workpiece and suction cup positioning in order to find suitable flat surfaces on the curved workpiece to suction grip, if such suitable flat surfaces could be found at all.

A combination pickup apparatus is disclosed in U.S. Pat. No. 4,121,865 issued to Littwin, Sr. This apparatus includes variable holding power to both electromagnet and vacuum cup pickup structure, with a permanent magnet feature as a standby safety. The apparatus is directed to picking up a plate or sheet of ferrous or non-ferrous material individually from a stack thereof. However, this device has several drawbacks associated therewith. Since it includes, in addition to a permanent magnet, both vacuum cup and electromagnet structure, the apparatus is quite complex to manufacture and operate, and in addition, is undesirably heavy. In many applications, the weight of the combination device makes it unsuitable for use in a lifting apparatus. Further, the apparatus has associated therewith the drawbacks described hereinabove in relation to electromagnetic lifting devices and vacuum suction cup lifting devices. Still further, since it is a combination apparatus, it is cumbersome to install and operate, as there are an unwieldy number of lines/hoses connected thereto, e.g. vacuum, pressure, electrical, connecting. Yet still further, there is no disclosure of a permanent magnet structure/material which can suitably operate alone (not as a standby) at all times. Still further, the apparatus generally requires a human operator to control the various operating modes, and does not appear to be suitable for use in an automation setting. Even further, there is no disclosure of a suitable permanent magnet material, such as, for example, a rare earth metal material, which provides increased magnetic holding strength in a smaller package.

Accordingly, it is an object of the present invention to provide a workpiece holder which is able to lift a wide variety of differently shaped and sized workpieces. It is a further object of the present invention to provide such a workpiece holder which does not consume an undesirably large amount of energy. It is yet a further object of the present invention to provide such a workpiece holder which is generally safe to use. Still further, it is an object of the present invention to provide such a workpiece holder which is powerful enough to lift whatever workpieces the manufacturer desires. Yet still further, it is an object of the present invention to provide such a workpiece holder which is efficient and cost effective to use. It is a further object of the present invention to provide such a workpiece holder which is relatively simple and inexpensive to manufacture, install and operate, and which may be adapted for use in various lifting assemblies. It is a further object of the present invention to provide such a workpiece holder which provides high magnetic lifting strength in a relatively compact structure. Still further, it is an object of the present invention to provide such a workpiece holder which is suitable for use in an automation setting.

SUMMARY OF THE INVENTION

The present invention addresses and solves the problems/drawbacks enumerated above, and encompasses other features and advantages as well. The present invention comprises a pneumatically actuated magnetic workpiece/article holder for use with a workpiece lifting assembly. The article holder comprises a housing having a magnetic assembly translationally mounted within the housing. The magnetic assembly comprises two opposed pole pieces and a permanent magnet centered and mounted between the pole pieces. A pneumatic actuator is mounted on the housing and is operatively connected to the magnetic assembly. The article holder may further comprise means for operatively mounting the article holder on the lifting assembly.

BRIEF DESCRIPTION OF THE DRAWINGS

Other objects, features, advantages and applications of the present invention will become apparent to those skilled in the art by reference to the following detailed description and drawings, in which:

FIG. 1 is a perspective view of the pneumatically actuated magnetic article holder of the present invention, shown assembled to a mounting bracket;

FIG. 2 is a front view of the pneumatically actuated magnetic article holder of the present invention, shown assembled to a mounting bracket;

DETAILED DESCRIPTION OF THE PREFERRED EMBODIMENTS

Figure 3:
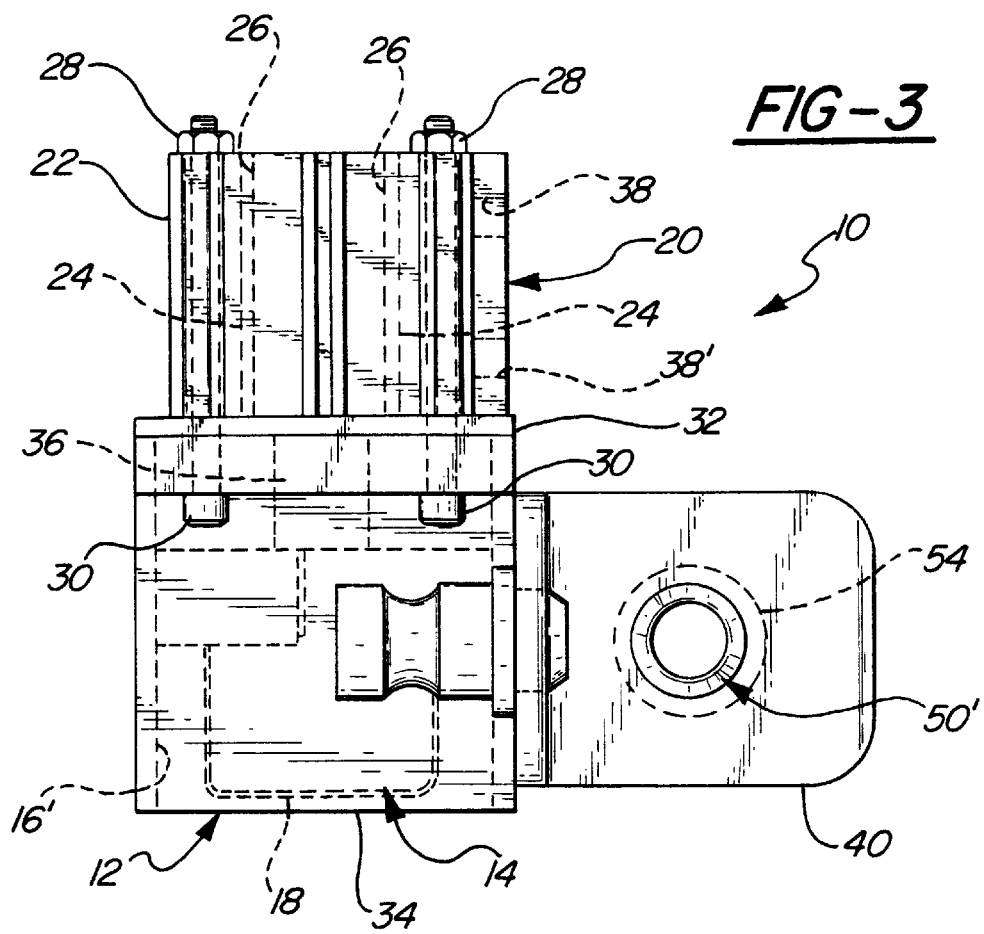
FIG. 3 is a side view of the holder of FIG. 2.

Referring now to FIGS. 1–3, the pneumatically actuated magnetic article holder of the present invention is designated generally as 10. Magnetic article holder 10 may be used in conjunction with a conventional lifting assembly (not shown), such as those found in any automation business, production sheet metal business, e.g. automotive manufacturer factories, appliance factories, furniture factories, and factories including welding assemblies, welding fixtures, spot welding, and the like. These lifting assemblies typically move sheet metal parts/articles/workpieces from, for example, one conveyor line to the next, one operation to the next, one stamping press line to another, one press to another, and/or one area (such as a general storage area) to another area, where the metal part may be installed in place on a later stage of, or on the final product (e.g. the automobile, the furniture, etc.).

Magnetic article holder 10 comprises a housing 12. It is to be understood that housing 12 may be formed in any suitable shape and size as desired, as long as it functions to place the article holder 10 in a desired operative gripping position on a given lifting assembly. The housing 12 may be formed from any suitable material, such as stainless steel or the like. However, housing 12 is preferably formed from a material having few or no ferromagnetic properties. Any suitable material may be used, such as a non-ferromagnetic metal, a polymeric material, wood, and the like. However, in the preferred embodiment, the housing 12 is formed from an aluminum material.

The magnetic article holder 10 further comprises a magnetic assembly 14 translationally mounted within the housing 12. It is to be understood that magnetic assembly 14 may be translationally mounted within housing 12 by any suitable means. The magnetic assembly 14 may be formed in any suitable shape and size, as desired and/or necessitated by the particular end use, magnetic strength desired, and the like. Magnetic assembly 14 comprises at least two opposed pole pieces 16, 16'. Pole pieces 16, 16' may be formed from any suitable ferromagnetic material, however, in the preferred embodiment, pole pieces 16, 16' are formed from steel. Pole pieces 16, 16' may be formed in any suitable shape and size; further, there may be additional pole pieces stacked beside pole pieces 16, 16'.

Magnetic assembly 14 further comprises a permanent magnet 18 centered and mounted between the pole pieces 16, 16'. Magnet 18 may be formed in any suitable shape and size, and of any suitable permanent magnetic material. In the preferred embodiment, magnet 18 is formed from neodymium, a rare earth metal having very strong magnetic properties. Neodymium is available as a powdered metal and is generally usable in block form. Although not as preferred, it is to be understood that other rare earth metals, such as samarium cobalt, may also be successfully used for certain applications not requiring as strong a magnet. Still further, it is to be understood that non-rare earth metals may successfully be used. For example, ferrite may be used. Further, in applications involving higher temperatures, alnico may be used as the magnet material.

Magnet 18 is preferably equidistantly centered between pole pieces 16, 16'. This may be accomplished by any suitable means, for example, by any suitable bearing or locating surface. An air gap, or any other suitable dielectric material, such as a polymeric material, may be located between magnet 18 and pole pieces 16, 16'. However, in the preferred embodiment, magnet 18 directly contacts the adjacent surfaces of pole pieces 16, 16', and pole piece 16, magnet 18 and pole piece 16' are welded together into the magnetic assembly unit 14. As opposed to a single magnet 18, there may be multiple magnets 18 disposed between pole pieces 16, 16'. Further, there may be multiple magnetic assemblies 14 mounted within housing 12, if desired.

Magnetic article holder 10 further comprises a pneumatic actuator 20 mounted on the housing 12 and operatively connected to the magnetic assembly 14. Any suitable pneumatic actuator may be used, as desired for the particular end use. One suitable actuator 20 is a two position pneumatic actuator, having a maximum pressure of 150 psi and commercially available from SMC Cylinder.

Actuator 20 comprises a housing 22. A cylinder 24 is disposed within housing 22, and a piston 26 is able to be driven in an upward and downward direction within cylinder 24. Housing 22 may be mounted to housing 12 by any suitable mounting and/or fastening means, as by, for example, a plurality of locking nut 28 and sockethead capscrew 30 assemblies. An optional spacer plate 32 may be installed between housing 22 and housing 12 if desired and/or necessary. Piston 26 is operatively connected to magnetic assembly 14 by any suitable means so as to translate magnetic assembly 14 upward, away from the gripping position in order to release the workpiece. Piston 26 may be connected to magnetic assembly 14 using, for example, a suitable rod or shaft 36. As seen in FIGS. 2 and 3, magnetic assembly 14 is in the gripping position at the gripping surface 34, and may be biased by any suitable means in that position. Piston 26 is driven in an upward position, thereby translating magnetic assembly 14 upward, by an air pressure source (not shown) operatively connected to pneumatic actuator 20 via air pressure port 38'.

Magnetic article holder 10 may further comprise means for operatively mounting the article holder 10 on the lifting assembly (not shown). It is to be understood that this mounting means may comprise any suitable means, as desired and/or necessitated by the particular lifting assembly with which holder 10 is used.

Figure 8A:
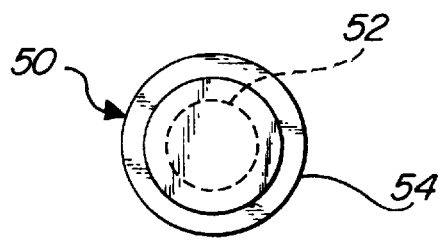
FIG. 8A is a front view of a pivot pin (two of which are shown assembled to the mounting bracket in each of FIGS. 2–5)
Figure 8B:
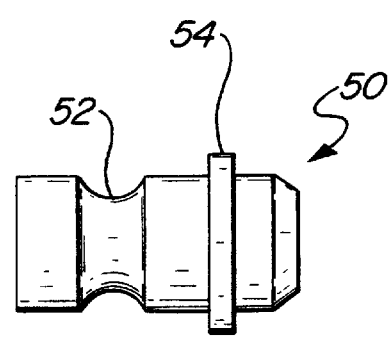
FIG. 8B is a side view of the pivot pin of FIG. 8A.
Figure 4:
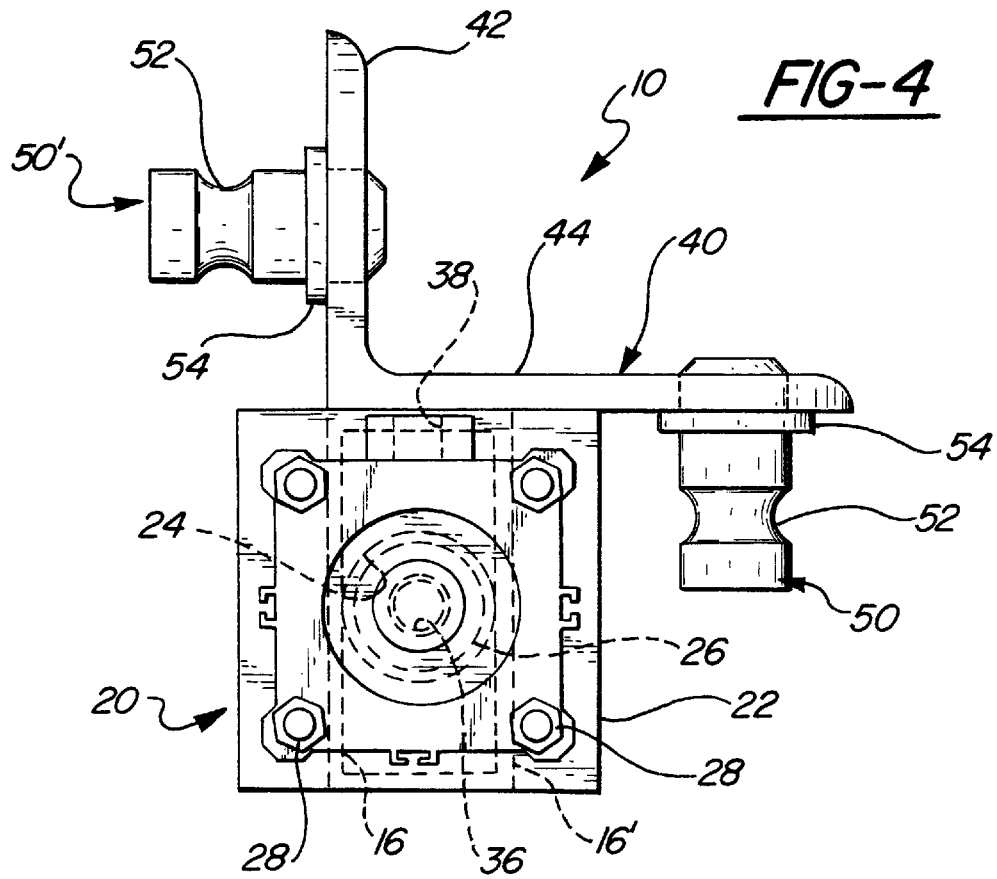
FIG. 4 is a top view of the holder of FIG. 2.
Figure 5:
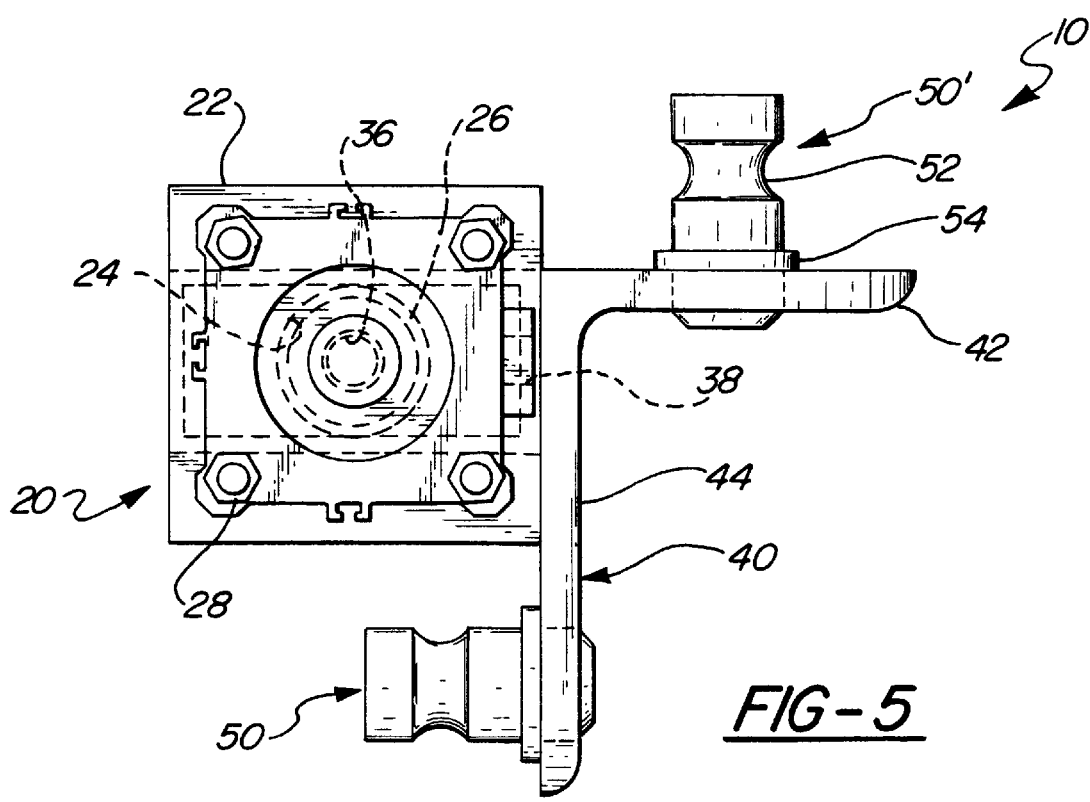
FIG. 5 is the view of FIG. 4 rotated 90°.
Figure 6A:
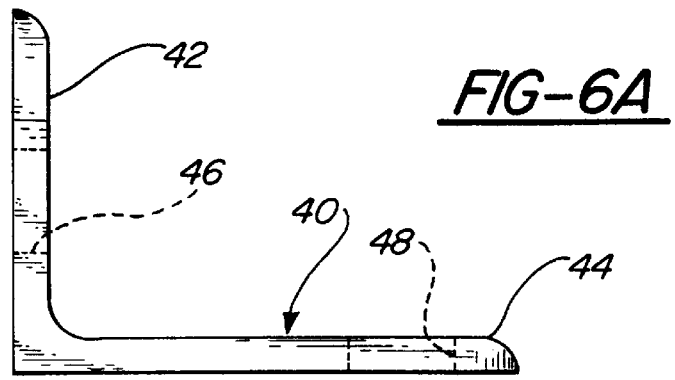
FIG. 6A is a top view of the mounting bracket without the pivot pins.
Figure 6B:
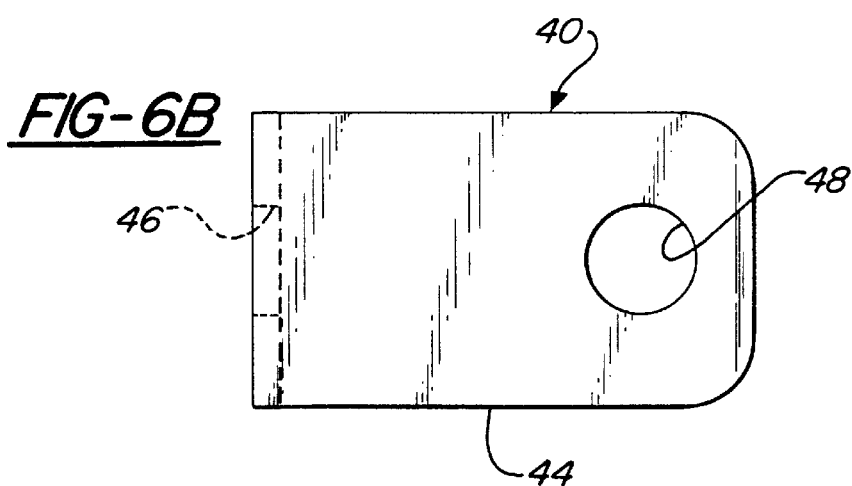
FIG. 6B is a front view of the mounting bracket of FIG. 6A.
Figure 7A:
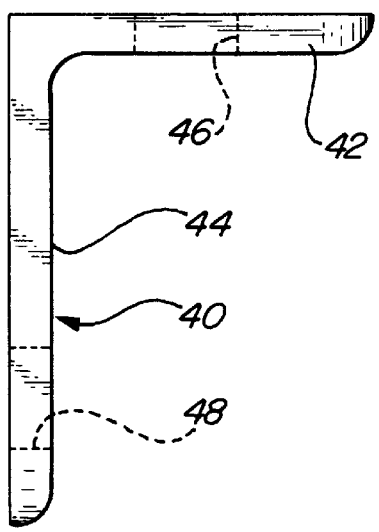
FIG. 7A is the view of FIG. 6A rotated 90°.
Figure 7B:
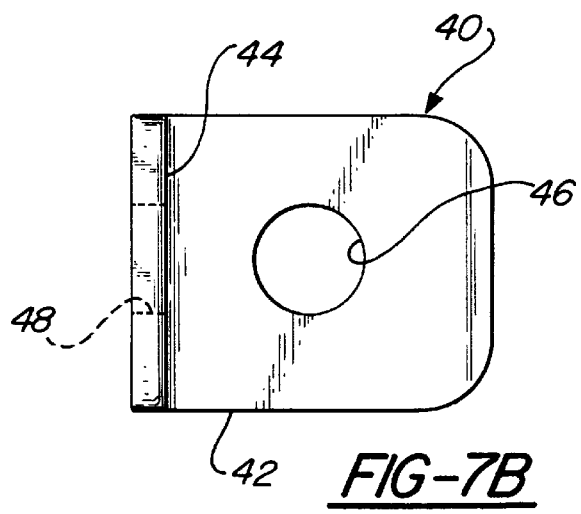
FIG. 7B is the view of FIG. 6B rotated 90°.

An example of a suitable mounting means is shown in FIGS. 4–7B. This mounting means comprises an L-shaped angle bracket 40 having a first leg 42 and a second leg 44. A bore 46 is defined in first leg 42, and a bore 48 is defined in second leg 44. As seen in FIGS. 8A and 8B, a pivot pin 50, 50' comprises a concave gripping surface 52 and an annular positioning flange 54. As best seen in FIGS. 2–5, a pivot pin 50, 50' is receivable within each of bores 46 and 48. Pivot pins 50, 50 may be fastened within bores 46, 48 by any suitable means, and/or may be integrally formed within bracket 40, however, in the preferred embodiment, pins 50, 50' are welded to bracket 40 within bores 46, 48. It is to be understood that bracket 40 may be mounted to article holder 10 at any suitable location on the holder 10, and by any suitable means, and/or may be integrally formed with article holder 10. An example of such a suitable fastening is depicted in FIGS. 2–5, wherein bracket 40 is welded to housing 12.

Pivot pin 50, 50', and/or any suitable component of any suitable mounting means, is operatively received by a lifting apparatus. Pivot pin 50, 50' advantageously allows rotation of holder 10 relative to the workpiece/article/sheet metal for quick and easy lifting thereof. Any other suitable component of any suitable mounting means may also include, by any suitable means, this advantageous holder 10 rotation/translation feature relative to the workpiece.

The magnetic article holder 10 of the present invention is generally for use with unpainted sheet metal parts. However, if used with painted or finished parts, it may be desirable to cover gripping surface 34 with an ultra high molecular weight (UHMW) polymeric coating to preserve the paint or finish.

Some of the advantages of the present invention include, but are not limited to the following.

As opposed to a vacuum source, air pressure is easily available from many sources ordinarily found in any factory, such as an automation factory, an automotive manufacturer factory, an automotive components manufacturer factory, a furniture factory, and/or, for example, any of the metal working/production sheet metal businesses mentioned hereinabove. Further, since only a pulsing (not constant) pressure is necessary to drive the pneumatic actuator, the air pressure is less expensive than a vacuum source.

The magnetic article holder 10 of the present invention may be used to lift parts of any size and shape, including parts having curved or irregular surfaces, as long as the curved surface bridges pole pieces 16, 16'. Holder 10, as opposed to suction cups, does not need to be kept very clean in order to function properly (which is quite advantageous in a factory setting). Holder 10 is generally smaller, and the lifting assembly may require fewer holders 10 than vacuum suction cups for an equivalent amount of lifting power.

In addition, as compared to electromagnetic holders, magnetic article holders 10 of the present invention are generally smaller and lighter for the same amount of lifting power. For example, in the preferred embodiment, the article holder 10 (excluding the mounting bracket 40) of the present invention is about 2.5 inches long, about 2.38 inches wide, and about 4.37 inches high. For further example, the article holder 10 of the present invention weighs about 2.32 lbs. A preferred weight ranges between about 2 lbs. and about 2 ½ lbs. However, it is to be understood that, as desired for a particular application, as stated further hereinabove, the holder 10 may be any suitable size, shape and weight.

While the invention has been described in connection with what is presently considered to be the most practical and preferred embodiment, it is to be understood that the invention is not to be limited to the disclosed embodiments but, on the contrary, is intended to cover various modifications and equivalent arrangements, which scope is to be accorded the broadest interpretation so as to encompass all such modifications and equivalent structures as is permitted under the law.

What is claimed is:

1. A pneumatically actuated magnetic article holder for use with a workpiece lifting assembly, the article holder comprising:

a housing;

a magnetic assembly translationally mounted within the housing, the magnetic assembly comprising:

two opposed pole pieces; and a permanent magnet centered and mounted between the pole pieces;

a pneumatic actuator mounted on the housing and operatively connected to the magnetic assembly; and means for operatively mounting the article holder on the lifting assembly comprising;

an L-shaped angle bracket welded to the housing, the bracket having a first leg and a second leg;

a first bore defined in the first leg, and a second bore defined in the second leg; and two pivot pins, one pin mounted within the first bore, and the other pin mounted within the second bore, each of the pivot pins comprising a concave gripping surface and an annular positioning flange;

wherein the pivot pin is operatively received by the lifting apparatus and allows rotation of the article holder relative to the workpiece.

2. The article holder as defined in claim 1 wherein the permanent magnet is formed from a rare earth metal.

3. The article holder as defined in claim 2 wherein the rare earth metal is selected from the group consisting of neodymium and samarium cobalt.

4. The article holder as defined in claim 2 wherein the rare earth metal is neodymium.

5. The article holder as defined in claim 1 wherein the permanent magnet is formed from a magnetic material selected from the group consisting of ferrite and alnico.

6. The article holder as defined in claim 1 wherein the pneumatic actuator comprises a two position pneumatic actuator having a maximum pressure of 150 psi.

7. The article holder as defined in claim 6 wherein the pneumatic actuator has a piston operatively disposed therein, and wherein the piston is operatively connected to the magnetic assembly so as to translate the magnetic assembly between a first position, away from a gripping position in order to release a workpiece, and a second position, toward the gripping position in order to grip the workpiece.

8. The article holder as defined in claim 1 wherein the housing is formed from an aluminum material.

9. The article holder as defined in claim 1 wherein the pole pieces are formed from steel.

10. The article holder as defined in claim 1, further comprising:

a gripping surface on the housing;

an ultra high molecular weight (UHMW) polymeric coating disposed on the gripping surface;

wherein the coating preserves a finish on a workpiece.

11. A pneumatically actuated magnetic article holder for use with a workpiece lifting assembly, the article holder comprising:

a housing;

a magnetic assembly translationally mounted within the housing, the magnetic assembly comprising:
   two opposed pole pieces; and
   a permanent magnet centered and mounted between the pole pieces, wherein the permanent magnet is formed from a rare earth metal;

a two position pneumatic actuator mounted on the housing and operatively connected to the magnetic assembly, the pneumatic actuator having a piston operatively disposed therein, the piston being operatively connected to the magnetic assembly so as to translate the magnetic assembly between a first position, away from a gripping position in order to release a workpiece, and a second position, toward the gripping position in order to grip the workpiece; and means for operatively mounting the article holder on the lifting assembly comprising;
   an L-shaped angle bracket welded to the housing, the bracket having a first leg and a second leg;
   a first bore defined in the first leg, and a second bore defined in the second leg; and
   two pivot pins, one pin mounted within the first bore, and the other pin mounted within the second bore, each of the pivot pins comprising a concave gripping surface and an annular positioning flange;
   wherein the pivot pin is operatively received by the lifting apparatus and allows rotation of the article holder relative to the workpiece.

12. The article holder as defined in claim 11 wherein the rare earth metal is neodymium.

13. The article holder as defined in claim 11 wherein the housing is formed from an aluminum material and wherein the pole pieces are formed from steel.

14. The article holder as defined in claim 11, further comprising:
   a gripping surface on the housing;
   an ultra high molecular weight (UHMW) polymeric coating disposed on the gripping surface;
   wherein the coating preserves a finish on a workpiece.

* * * * *